(12) United States Patent
Watanabe (10) Patent No.: US 7,998,840 B2
(45) Date of Patent: Aug. 16, 2011

(54) WAFER LASER PROCESSING METHOD AND APPARATUS

(75) Inventor: Yosuke Watanabe, Tokyo (JP)

(73) Assignee: Disco Corporation, Tokyo (JP)

( * ) Notice: Subject to any disclaimer, the term of this patent is extended or adjusted under 35 U.S.C. 154(b) by 7 days.

(21) Appl. No.: 12/468,317

(22) Filed: May 19, 2009

(65) Prior Publication Data

US 2009/0291544 A1 Nov. 26, 2009

(30) Foreign Application Priority Data

May 20, 2008 (JP) ................................ 2008-132208

(51) Int. Cl.
*H01L 21/00* (2006.01)
(52) U.S. Cl. ........ 438/463; 438/460; 438/799; 438/940; 257/E21.596; 257/E21.238
(58) Field of Classification Search .................. 438/460, 438/463, 799, 940; 257/E21.596, E21.471, 257/E21.332, E21.238; 216/94
See application file for complete search history.

(56) References Cited

U.S. PATENT DOCUMENTS

2004/0137702 A1* 7/2004 Iijima et al. .................. 438/463

2009/0155935 A1* 6/2009 Harris et al. .................. 438/14
2010/0213594 A1* 8/2010 Higashino et al. ........... 257/686

FOREIGN PATENT DOCUMENTS

| JP | 01-133703 | * 5/1989 |
| JP | 3408805 | 3/2003 |

OTHER PUBLICATIONS

Abstract JP01-133703A Kamata (May 1989) 1 page.*

* cited by examiner

*Primary Examiner* — Caridad M Everhart (74) *Attorney, Agent, or Firm* — Smith, Gambrell & Russell, LLP (57) ABSTRACT

A wafer laser processing method for forming deteriorated layers in the inside of a wafer having a device area and a peripheral excess area surrounding the device area, the surface of the device area being higher than the surface of the peripheral excess area, involving a first step for forming a deteriorated layer in the insides of the peripheral excess area and device area by applying a laser beam to the peripheral excess area and the device area with its focal point set in the material of the peripheral excess area and the device area from the front surface side of the wafer; and a second step for forming a deteriorated layer in the inside of the device area by applying a laser beam to the device area with its focal point set in the material of the device area without applying the laser beam to the peripheral excess area.

8 Claims, 9 Drawing Sheets

WAFER LASER PROCESSING METHOD AND APPARATUS

FIELD OF THE INVENTION

The present invention relates to a wafer laser processing method and apparatus for forming a plurality of deteriorated layers along a plurality of streets in the inside of a wafer having a device area where a plurality of areas are sectioned by the plurality of streets arranged in a lattice pattern on the front surface and devices are formed in the sectioned areas and having a peripheral excess area surrounding the device area, the surface of the device area being formed to be higher than the surface of the peripheral excess area, by applying a laser beam along the streets from the front surface side of the wafer with its focal point set to the inside of the wafer.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a device such as IC or LSI is formed in each of the sectioned areas. Individual semiconductor chips are manufactured by cutting this semiconductor wafer along the streets to divide it into the areas each having a circuit formed thereon. An optical device wafer comprising a gallium nitride-based compound semiconductor on the front surface of a sapphire substrate is also cut along streets to be divided into individual optical devices such as light emitting diodes or laser diodes which are widely used in electric appliances.

As a means of dividing a plate-like workpiece such as a semiconductor wafer, a laser processing method for applying a pulse laser beam having permeability for the workpiece with its focal point set to the inside of the area to be divided is also attempted and disclosed by Japanese Patent No. 3408805, for example. In the dividing method making use of this laser processing technique, the workpiece is divided by applying a pulse laser beam of a wavelength (for example, 1,064 nm) having permeability for the workpiece from one surface side of the workpiece with its focal point set to the inside to continuously form a deteriorated layer in the inside of the workpiece along the streets and exerting external force along the streets whose strength has been reduced by the formation of the deteriorated layers.

In a wafer having devices such as micro electric mechanical systems (MEMS) formed thereon, however, the surface of a device area where the devices are formed is made higher than the surface of a peripheral excess area surrounding the device area by several tens to several hundreds of μm. Therefore, even when the focal point of a laser beam is positioned in the inside of the device area to form deteriorated layers in the inside of the wafer, the focal point may be positioned, in some circumstances, near the front surface in the peripheral excess area depending on the depth of the focal point. Therefore, even when a laser beam of a wavelength having permeability for the wafer is applied, if its focal point is positioned near the front surface, ablation occurs, thereby a problem arises that debris produced are scattered and adhered to a device to reduce its quality.

SUMMARY OF THE INVENTION

It is an object of the present invention to provide a wafer laser processing method and apparatus capable of forming deteriorated layers along streets in the inside of a wafer without causing ablation, even when there is a difference in height between the surface of the device area forming the wafer and the surface of the peripheral excess area surrounding the device area.

To attain the above object, according to the present invention, there is provided a wafer laser processing method for forming deteriorated layers along a plurality of streets in the inside of a wafer having a device area where a plurality of areas are sectioned by the plurality of streets arranged in a lattice pattern on the front surface and devices are formed in the sectioned areas and having a peripheral excess area surrounding the device area, the surface of the device area being formed to be higher than the surface of the peripheral excess area, by applying a laser beam from the front surface side of the wafer along the streets with its focal point set to the inside of the wafer, comprising:

a first deteriorated layer forming step for forming a deteriorated layer along the streets in the insides of the peripheral excess area and the device area by applying a laser beam to the peripheral excess area and the device area along the streets with its focal point set to the insides of the peripheral excess area and the device area from the front surface side of the wafer; and a second deteriorated layer forming step for forming a deteriorated layer along the streets in the inside of the device area by applying a laser beam to the device area along the streets with its focal point set to the inside of the device area without applying the laser beam to the peripheral excess area when the focal point of the laser beam is positioned near the front surface of the peripheral excess area.

According to the present invention, there is further provided a laser beam processing apparatus comprising a chuck table having a holding surface for holding a wafer, a laser beam application means having a condenser for applying a laser beam to the wafer held on the chuck table, a focal point position adjustment means for changing the position of the focal point of a laser beam converged by the condenser of the laser beam application means, a processing-feed means for moving the chuck table in a processing-feed direction (X direction), an indexing-feed means for moving the chuck table in an indexing-feed direction (Y direction) perpendicular to the processing-feed direction, an X-direction position detection means for detecting the processing-feed position of the chuck table, a Y-direction position detection means for detecting the indexing-feed position of the chuck table, a Z-direction position detection means for detecting the focal point (Z-direction) position of the condenser adjusted by the focal point position adjustment means, a height position detection means for detecting the height position of the top surface of the wafer held on the chuck table, and a control means for receiving detection signals from the height position detection means, the X-direction position detection means, the Y-direction position detection means and the Z-direction position detection means and outputting a control signal to the laser beam application means, the focal point position adjustment means, the processing-feed means and the indexing-feed means, wherein at the time to form deteriorated layers along a plurality of streets in the inside of a wafer having a device area where a plurality of areas are sectioned by the plurality of streets arranged in a lattice pattern on the front surface and devices are formed in the sectioned areas and having a peripheral excess area surrounding the device area, the surface of the device area being formed to be higher than the surface of the peripheral excess area, by applying a laser beam along the streets from the front surface side of the wafer with its focal point set to the inside of the wafer, the control means carries out the following steps:

a boundary position detection step for detecting the height positions of the peripheral excess area and the device area of the wafer and the boundary position between the peripheral excess area and the device area based on detection signals from the height position detection means, the X-direction position detection means and the Y-direction position detection means and storing the coordinate values of the boundary position in a storage means;

a first deteriorated layer forming step for forming a deteriorated layer along the streets in the insides of the peripheral excess area and the device area by applying a laser beam to the peripheral excess area and the device area along the streets with its focal point set to the insides of the peripheral excess area and the device area when the focal point of the laser beam applied from the laser beam application means is positioned in the insides of the peripheral excess area and the device area based on the height positions of the peripheral excess area and the device area of the wafer and the boundary position detected by the boundary position detection step; and a second deteriorated layer forming step for forming a deteriorated layer along the streets in the inside of the device area by applying a laser beam to the device area along the streets with its focal point set to the inside of the device area without applying the laser beam to the peripheral excess area when the focal point of the laser beam applied from the laser beam application means is positioned near the front surface of the peripheral excess area of the wafer.

Since the first deteriorated layer forming step in which a deteriorated layer is formed along the streets in the insides of the peripheral excess area and the device area by applying a laser beam to the peripheral excess area and the device area along the streets with its focal point set to the insides of the peripheral excess area and the device area from the front surface side of the wafer and the second deteriorated layer forming step in which a deteriorated layer is formed along the streets in the inside of the device area by applying a laser beam to the device area along the streets with its focal point set to the inside of the device area without applying a laser beam to the peripheral excess area when the focal point of the laser beam is positioned near the front surface of the peripheral excess area are comprised in the present invention, when the focal point of the laser beam is positioned near the front surface of the peripheral excess area, a laser beam is not applied to the peripheral excess area, whereby ablation does not occur and accordingly, debris are not produced. Therefore, it is possible to prevent debris produced by ablation from adhering to a device when a laser beam is applied near the front surface of the peripheral excess area.

DETAILED DESCRIPTION OF THE PREFERRED EMBODIMENTS

Preferred embodiments of a wafer laser processing method and apparatus constituted according to the present invention will be described in more detail hereinunder with reference to the accompanying drawings.

Figure 1:
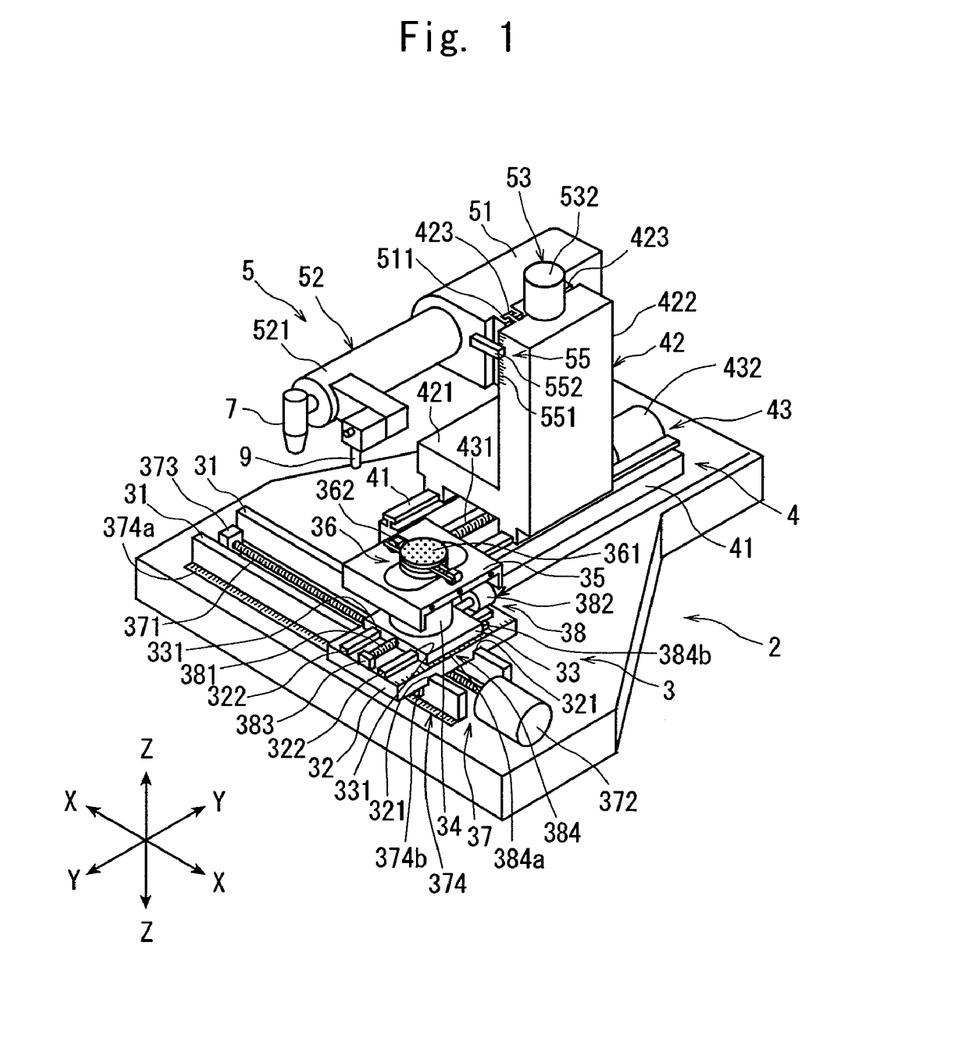
FIG. 1 is a perspective view of a laser beam processing apparatus constituted according to the present invention.

FIG. 1 is a perspective view of a laser beam processing apparatus constituted according to the present invention. The laser beam processing apparatus shown in FIG. 1 comprises a stationary base 2, a chuck table mechanism 3 for holding a workpiece, which is mounted on the stationary base 2 in such a manner that it can move in a processing-feed direction indicated by an arrow X, a laser beam application unit support mechanism 4 mounted on the stationary base 2 in such a manner that it can move in an indexing-feed direction (Y direction) indicated by an arrow Y perpendicular to the direction (X direction) indicated by the arrow X, and a laser beam application unit 5 mounted on the laser beam application unit support mechanism 4 in such a manner that it can move in a direction (Z direction) indicated by an arrow Z.

The above chuck table mechanism 3 comprises a pair of guide rails 31 and 31 mounted on the stationary base 2 and arranged parallel to each other in the processing-feed direction indicated by the arrow X, a first sliding block 32 mounted on the guide rails 31 and 31 in such a manner that it can move in the processing-feed direction (X direction) indicated by the arrow X, a second sliding block 33 mounted on the first sliding block 32 in such a manner that it can move in the indexing-feed direction (Y direction) indicated by the arrow Y, a cover table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on the adsorption chuck 361 as a workpiece holding surface by a suction means that is not shown. The chuck table 36 constituted as described above is rotated by a pulse motor (not shown) installed in the cylindrical member 34. The chuck table 36 is provided with clamps 362 for fixing an annular frame, which will be described later.

The above first sliding block 32 has, on the undersurface, a pair of to-be-guided grooves 321 and 321 to be fitted to the above pair of guide rails 31 and 31 and, on the top surface, a pair of guide rails 322 and 322 formed parallel to each other in the indexing-feed direction indicated by the arrow Y. The first sliding block 32 constituted as described above can move along the pair of guide rails 31 and 31 in the processing-feed direction indicated by the arrow X by fitting the to-be-guided grooves 321 and 321 to the pair of guide rails 31 and 31, respectively. The chuck table mechanism 3 in the illustrated embodiment comprises a processing-feed means 37 for moving the first sliding block 32 along the pair of guide rails 31 and 31 in the processing-feed direction indicated by the arrow X. The processing-feed means 37 has a male screw rod 371 arranged between the above pair of guide rails 31 and 31 in parallel thereto and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or adverse direction with the pulse motor 372, the first sliding block 32 is moved along the guide rails 31 and 31 in the processing-feed direction (X direction) indicated by the arrow X.

The laser beam processing apparatus in the illustrated embodiment comprises an X-direction position detection means 374 for detecting the X-direction position of the above chuck table 36. The X-direction position detection means 374 comprises a linear scale 374a that is arranged along the guide rail 31 and a read head 374b that is mounted on the first sliding block 32 and moves along the linear scale 374a together with the first sliding block 32. The read head 374b of this X-direction position detection means 374 supplies one pulse signal for every 1 μm to a control means which will be described later in the illustrated embodiment. The control means (that will be described later) counts the input pulse signals to detect the X-direction position of the chuck table 36.

The above second sliding block 33 has, on the undersurface, a pair of to-be-guided grooves 331 and 331 to be fitted to the pair of guide rails 322 and 322 on the top surface of the above first sliding block 32 and can move in the indexing-feed direction (Y direction) indicated by the arrow Y by fitting the to-be-guided grooves 331 and 331 to the pair of guide rails 322 and 322, respectively. The chuck table mechanism 3 in the illustrated embodiment comprises a first indexing-feed means 38 for moving the second sliding block 33 along the pair of guide rails 322 and 322 provided on the first sliding block 32 in the indexing-feed direction (Y direction) indicated by the arrow Y. The first indexing-feed means 38 has a male screw rod 381 which is arranged between the above pair of guide rails 322 and 322 in parallel thereto and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or adverse direction with the pulse motor 382, the second sliding block 33 is moved along the guide rails 322 and 322 in the indexing-feed direction (Y direction) indicated by the arrow Y.

The laser beam processing apparatus in the illustrated embodiment comprises a Y-direction position detection means 384 for detecting the Y-direction position of the above second sliding block 33. This Y-direction position detection means 384 comprises a linear scale 384a that is arranged along the guide rail 322 and a read head 384b that is mounted on the second sliding block 33 and moves along the linear scale 384a together with the second sliding block 33. The read head 384b of the Y-direction position detection means 384 supplies one pulse signal for every 1 μm to the control means (described later) in the illustrated embodiment. The control means (described later) counts the input pulse signals to detect the Y-direction position of the chuck table 36.

The above laser beam application unit support mechanism 4 comprises a pair of guide rails 41 and 41 mounted on the stationary base 2 and arranged parallel to each other in the indexing-feed direction (Y direction) indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction (Y direction) indicated by the arrow Y. This second indexing-feed means 43 has a male screw rod 431 arranged between the above pair of guide rails 41 and 41 in parallel thereto and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or adverse direction with the pulse motor 432, the movable support base 42 is moved along the guide rails 41 and 41 in the indexing-feed direction (Y direction) indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 provided on the above mounting portion 422 and is supported in such a manner that it can move in the direction (Z direction) indicated by the arrow Z by fitting the to-be-guided grooves 511 and 511 to the above guide rails 423 and 423, respectively.

The laser beam application unit 5 in the illustrated embodiment comprises a focal point position adjustment means 53 for moving the unit holder 51 along the pair of guide rails 423 and 423 in the focal point position adjustment direction (Z direction) indicated by the arrow Z. The focal point position adjustment means 53 has a male screw rod (not shown) arranged between the pair of guide rails 423 and 423 and a drive source such as a pulse motor 532 for rotary-driving the male screw rod. By driving the male screw rod (not shown) in a normal direction or adverse direction with the pulse motor 532, the unit holder 51 and the laser beam application means 52 are moved along the guide rails 423 and 423 in the focal point position adjustment direction (Z direction) indicated by the arrow Z. In the illustrated embodiment, the laser beam application means 52 is moved up by driving the pulse motor 532 in the normal direction and moved down by driving the pulse motor 532 in the adverse direction.

The laser beam application unit 5 in the illustrated embodiment comprises a Z-direction position detection means 55 for detecting the Z-direction position of the laser beam application means 52. This Z-direction position detection means 55 is composed of a linear scale 551 that is arranged in parallel to the guide rails 423 and 423 and a read head 552 that is mounted on the unit holder 51 and moves along the linear scale 551 together with the unit holder 51. The read head 552 of the Z-direction position detection means 55 supplies one pulse signal for every 1 μm to the control means (described later) in the illustrated embodiment.

Figure 2:
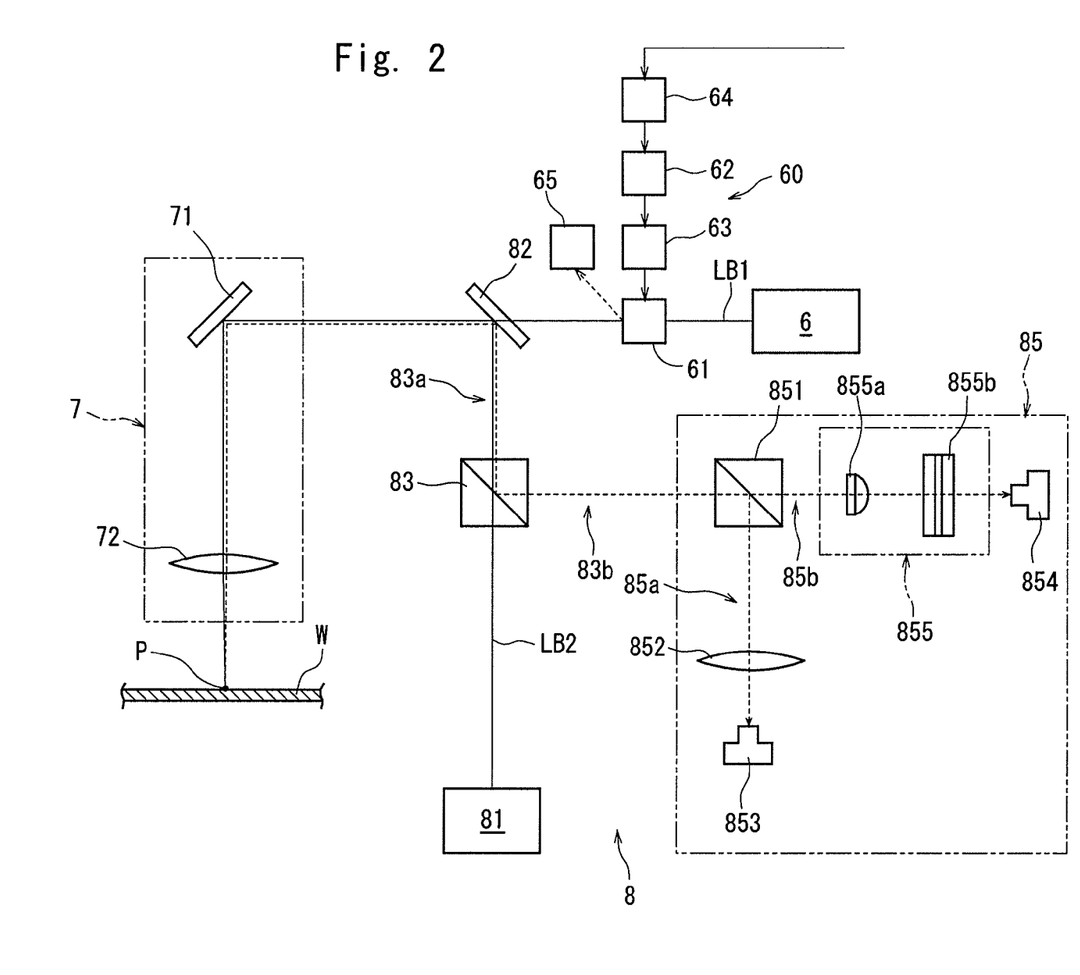
FIG. 2 is a block diagram showing the constitutions of a laser beam application means and height position detection means for a workpiece held on a chuck table, provided in the laser beam processing apparatus shown in FIG. 1.

The illustrated laser beam application means 52 comprises a cylindrical casing 521 arranged substantially horizontally. A processing pulse laser beam oscillation means 6 is installed in this cylindrical casing 521 as shown in FIG. 2, and a condenser 7 for applying a processing pulse laser beam oscillated from the processing pulse laser beam oscillation means 6 to the workpiece held on the chuck table 36 is mounted onto the end of the casing 521. The processing pulse laser beam oscillation means 6 oscillates a processing pulse laser beam LB1 of a wavelength having permeability for a wafer as the workpiece. As this processing pulse laser beam oscillation means 6 may be used a YVO4 pulse laser oscillator or YAG pulse laser oscillator which oscillates a processing pulse laser beam LB1 of a wavelength (for example, 1,064 nm) having permeability for the workpiece.

The above condenser 7 comprises a direction-changing mirror 71 for changing the direction of the processing pulse laser beam LB1 oscillated from the above processing pulse laser beam oscillation means 6 to a downward direction in FIG. 2 and a condenser lens 72 for converging the processing pulse laser beam LB1 whose direction has been changed by the direction-changing mirror 71. The condenser lens 72 focuses the processing pulse laser beam LB1 whose direction has been changed by the direction-changing mirror 71 at a focal point P.

The laser beam application means 52 in the illustrated embodiment comprises an optical axis changing means 60 for deflecting the optical axis of the processing pulse laser beam oscillated from the processing pulse laser beam oscillation means 6. This optical axis changing means 60 comprises an acousto-optic device 61 installed in the optical path of the processing pulse laser beam oscillated from the processing pulse laser beam oscillation means 6, an RF oscillator 62 for generating RF (radio frequency) to be applied to the acousto-optic device 61, an RF amplifier 63 for amplifying the power of RF generated by the RF oscillator 62 to apply it to the acousto-optic device 61, and a deflection angle adjustment means 64 for adjusting the frequency of RF generated by the RF oscillator 62 in the illustrated embodiment. The above acousto-optic device 61 adjusts the deflection angle of the optical axis of a laser beam according to the frequency of the applied RF. The above deflection angle adjustment means 64 is controlled by the control means that will be described later.

The optical axis changing means 60 in the illustrated embodiment comprises a laser beam absorbing means 65 for absorbing a laser beam deflected by the acousto-optic device 61 as shown by a broken line in FIG. 2 when RF having a predetermined frequency is applied to the above acousto-optic device 61.

The optical axis changing means 60 in the illustrated embodiment is constituted as described above, and its function will be described with reference to FIG. 2.

When a voltage of, for example, 0 V is applied to the deflection angle adjustment means 64 constituting the optical axis changing means 60 to apply RF having a frequency corresponding to 0 V to the acousto-optic device 61, the optical axis of the processing pulse laser beam LB1 oscillated from the processing pulse laser beam oscillation means 6 is directed to the direction changing mirror 71 of the condenser 7. When a voltage of, for example, 10 V is applied to the deflection angle adjustment means 64 to apply RF having a frequency corresponding to 10 V to the acousto-optic device 61, the processing pulse laser beam LB1 oscillated from the processing pulse laser beam oscillation means 6 is guided to the laser beam absorbing means 65 as shown by the broken line in FIG. 2.

Still referring to FIG. 2, the laser beam processing apparatus in the illustrated embodiment comprises a height position detection means 8 for detecting the height position of the top surface of the workpiece held on the chuck table. The height position detection means 8 comprises a detection laser beam oscillation means 81 for oscillating a detection laser beam, a dichroic mirror 82, which is installed in a path between the optical axis changing means 60 of the above processing pulse laser beam oscillation means 6 and the condenser 7, for deflecting a detection laser beam oscillated from the detection laser beam oscillation means 81 toward the condenser 7, and a first beam splitter 83, which is interposed between the detection laser beam oscillation means 81 and the dichroic mirror 82, for guiding a detection laser beam oscillated from the detection laser beam oscillation means 81 to a first path 83a toward the dichroic mirror 82.

As this detection laser beam oscillation means 81 may be used a He–Ne pulse laser oscillator which oscillates a detection laser beam LB2 of a wavelength (for example, 632 nm) having reflectivity for the workpiece. The output of the detection laser beam LB2 oscillated from the detection laser beam oscillation means 81 is set to 10 mW in the illustrated embodiment. The dichroic mirror 82 allows the processing pulse laser beam LB1 to pass through but reflects the detection laser beam LB2 oscillated from the detection laser beam oscillation means 81 toward the condenser 7. The first beam splitter 83 guides the detection laser beam LB2 oscillated from the detection laser beam oscillation means 81 to the first path 83a toward the above dichroic mirror 82 and also guides the reflected light (later described) deflected by the dichroic mirror 82 to a second path 83b.

The height position detection means 8 in the illustrated embodiment has a reflected light analyzing means 85, which is installed in the second path 83b, for analyzing reflected light reflected by the first beam splitter 83 and supplying the result of analysis to the control means that will be described later. The reflected light analyzing means 85 comprises a second beam splitter 851 for splitting reflected light reflected by the first beam splitter 83 into a third path 85a and a fourth path 85b, a condenser lens 852 for converging 100% of the reflected light split into the third path 85a by the second beam splitter 851, and a first light-receiving device 853 for receiving the reflected light converged by the condenser lens 852. The first light-receiving device 853 supplies a voltage signal corresponding to the quantity of its received light to the control means that is described later. The reflected light analyzing means 85 in the illustrated embodiment comprises a second light-receiving device 854 for receiving the reflected light split into the fourth path 85b by the second beam splitter 851 and a light receiving area restricting means 855 for restricting the receiving area of the reflected light to be received by the second light-receiving device 854. The light receiving area restricting means 855 in the illustrated embodiment is composed of a cylindrical lens 855a for converging the reflected light split into the fourth path 85b by the second beam splitter 851 unidimensionally and a unidimensional mask 855b for restricting the reflected light converged unidimensionally by the cylindrical lens 855a to a unit length. The second light-receiving device 854 for receiving the reflected light passing through the unidimensional mask 855b supplies a voltage signal corresponding to the quantity of its received light to the control means that will be described later.

The height position detection means 8 in the embodiment shown in FIG. 2 is constituted as described above, and its function will be described hereinbelow.

The detection laser beam LB2 oscillated from the detection laser beam oscillation means 81 passes through the first beam splitter 83 and reaches the dichroic mirror 82 to be reflected toward the direction changing mirror 71 of the condenser 7. The detection laser beam LB2 reflected toward the direction changing mirror 71 is converged by the condenser lens 72, like the above processing pulse laser beam LB1. The detection laser beam LB2 converged as described above is reflected on the top surface of the workpiece held on the chuck table 36, and this reflected light reaches the second beam splitter 851 of the reflected light analyzing means 85 through the condenser lens 72, the direction changing mirror 71, the dichroic mirror 82 and the first beam splitter 83 as shown by the broken line in FIG. 2. The reflected light of the detection laser beam LB2 reaching the second beam splitter 851 is split into the third path 85a and the fourth path 85b by the second beam splitter 851. The reflected light of the detection laser beam LB2 split into the third path 85a is 100% converged by the condenser lens 852 and received by the first light-receiving device 853. Then, the first light-receiving device 853 supplies a voltage signal corresponding to the quantity of its received light to the control means that will be described later. Meanwhile, the reflected light of the detection laser beam LB2 split into the fourth path 85b is converged unidimensionally by the cylindrical lens 855a of the light receiving area restricting means 855, restricted to a predetermined unit length by the unidimensional mask 855b and received by the second light-receiving device 854. And then, the second light-receiving device 854 supplies a voltage signal corresponding to the quantity of its received light to the control means that will be described later.

A description will be subsequently given of the quantity of the reflected light of the detection laser beam LB2 to be received by the first light-receiving device 853 and the second light-receiving device 854.

Figure 3:
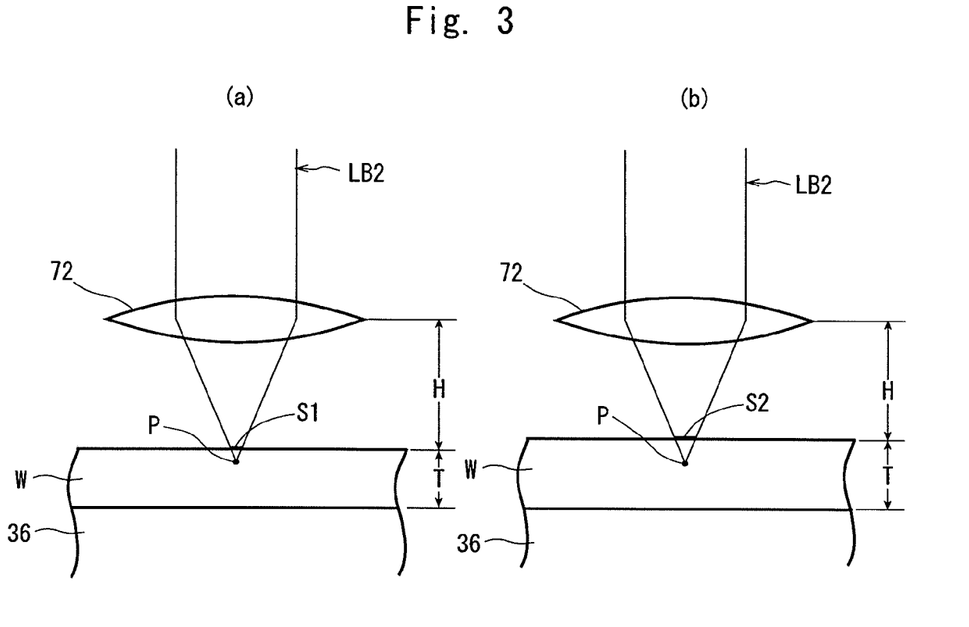
FIGS. 3(a) and 3(b) are explanatory diagrams showing that a detection laser beam is applied to the workpiece which has a level difference and is held on the chuck table by the height position detection means shown in FIG. 2.

Since the reflected light to be received by the first light-receiving device 853 is 100% converged by the condenser lens 852, the quantity of received light is constant and a voltage value (V1) output from the first light-receiving device 853 is constant (for example, 10 V). Meanwhile, since the reflected light to be received by the second light-receiving device 854 is converged unidimensionally by the cylindrical lens 855a of the light receiving area restricting means 855, then restricted to the predetermined unit length by the unidimensional mask 855b and received by the second light-receiving device 854, the quantity of light received by the second light-receiving device 854 changes according to the distance from the condenser lens 72 of the condenser 7 to the top surface of the workpiece W, that is, the height position (thickness) of the workpiece W at the time when the detection laser beam LB2 is applied to the top surface of the workpiece W, as shown in FIGS. 3(a) and 3(b). Therefore, a voltage value (V2) output from the second light-receiving device 854 changes according to the height position of the top surface of the workpiece W to which the detection laser beam LB2 is applied.

For instance, when the height position of the workpiece W is low (the thickness of the workpiece W is small) and the distance (H) from the condenser lens 72 of the condenser 7 up to the top surface of the workpiece W is large, as shown in FIG. 3(a), the detection laser beam LB2 applied to the top surface of the workpiece W is reflected at a spot S1. This reflected light is split into the third path 85a and the fourth path 85b by the second beam splitter 851 as described above. Since the reflected light having the spot S1, which has been split into the third path 85a, is 100% converged by the condenser lens 852, the first light-receiving device 853 receives the quantity of all the reflected light. Meanwhile, since the reflected light having the spot S1, which has been split into the fourth path 85b by the second beam splitter 851, is converged unidimensionally by the cylindrical lens 855a, its section becomes substantially rectangular. Since the reflected light whose section has been thus narrowed down to a substantially rectangular form is restricted to the predetermined unit length by the unidimensional mask 855b, the second light-receiving device 854 receives part of the reflected light split into the fourth path 85b. Therefore, the quantity of the reflected light received by the second light-receiving device 854 becomes smaller than the quantity of light received by the first light-receiving device 853.

When the height position of the workpiece W is high (the thickness of the workpiece W is large) and the distance (H) from the condenser lens 72 of the condenser 7 up to the top surface of the workpiece W is small, as shown in FIG. 3(b), the detection laser beam LB2 applied to the top surface of the workpiece W is reflected at a spot S2. This spot S2 is larger than the above spot S1. The reflected light having the spot S2 is split into the third path 85a and the fourth path 85b by the second beam splitter 851 as described above. Since the reflected light having the spot S2, which has been split into the third path 85a, is 100% converged by the condenser lens 852, the first light-receiving device 853 receives the quantity of all the reflected light. Meanwhile, since the reflected light having the spot S2, which has been split into the fourth path 85b by the second beam splitter 851, is converged unidimensionally by the cylindrical lens 855a, its section becomes substantially rectangular. The length of the long side of this rectangle becomes larger than that of the spot S1 because the spot S2 is larger than the above spot S1. Since the reflected light converged to have a substantially rectangular section is restricted to the predetermined length by the unidimensional mask 855b, the second light-receiving device 854 receives part of the reflected light. Therefore, the quantity of reflected light received by the second light-receiving device 854 is smaller than in the case shown in FIG. 3(a). Therefore, the quantity of the reflected light received by the second light-receiving device 854 becomes larger as the distance (H) from the condenser lens 72 of the condenser 7 up to the top surface of the workpiece W becomes longer, that is, the height position of the workpiece W becomes lower (the thickness (T) of the workpiece W becomes smaller) and becomes smaller as the distance (H) from the condenser lens 72 of the condenser 7 up to the top surface of the workpiece W becomes shorter, that is, the height position of the workpiece W becomes higher (the thickness (T) of the workpiece W becomes larger).

Figure 4:
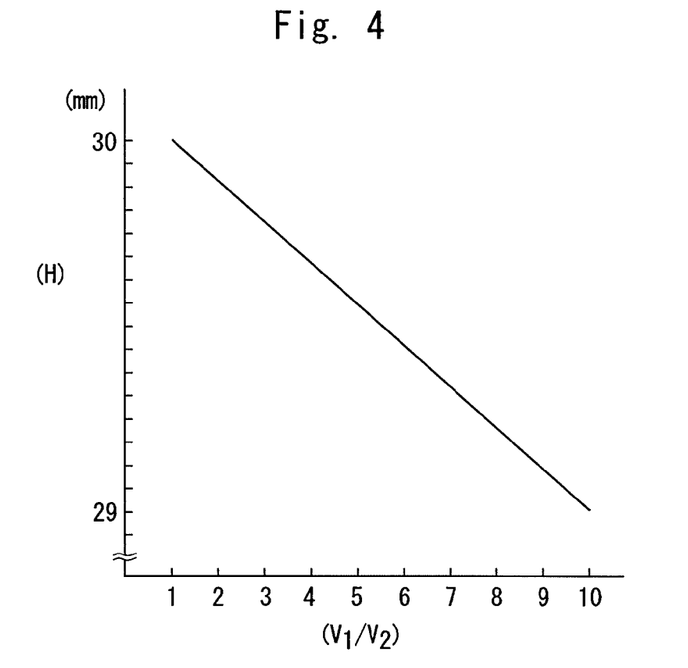
FIG. 4 is a control map showing the relationship between the ratio of a voltage value (V1) output from a first light-receiving device to a voltage value (V2) output from a second light-receiving device constituting the height position detection means shown in FIG. 2 and a predetermined distance (H) from a condenser to the top surface of the workpiece.

The relationship between the ratio of the voltage value (V1) output from the above first light-receiving device 853 to the voltage value (V2) output from the second light-receiving device 854 and the distance (H) from the condenser lens 72 of the condenser 7 to the top surface of the workpiece W, that is, the thickness (T) of the workpiece W held on the chuck table 36 will be described with reference to a control map shown in FIG. 4. In FIG. 4, the horizontal axis indicates the (V1/V2) ratio of the voltage value (V1) output from the first light-receiving device 853 to the voltage value (V2) output from the second light-receiving device 854 and the vertical axis indicates the distance (H) from the condenser lens 72 of the condenser 7 up to the top surface of the workpiece W. In the control map shown in FIG. 4, a condenser lens having a focal distance of 30 mm is used. When the distance (H) from the condenser lens 72 of the condenser 7 to the top surface of the workpiece W is 30 mm, the (V1/V2) ratio of the voltage value (V1) output from the first light-receiving device 853 to the voltage value (V2) output from the second light-receiving device 854 is "1". As the distance (H) from the condenser lens 72 of the condenser 7 to the top surface of the workpiece W becomes shorter, in other words, the thickness (T) of the workpiece W becomes larger, the above (V1/V2) ratio increases. Therefore, the distance (H) from the condenser lens 72 of the condenser 7 to the top surface of the workpiece W, that is, the thickness (T) of the workpiece W held on the chuck table 36 can be detected by obtaining the (V1/V2) ratio of the voltage value (V1) output from the first light-receiving device 853 to the voltage value (V2) output from the second light-receiving device 854 and collating it with the control map shown in FIG. 4. The control map shown in FIG. 4 is stored in the memory of the control means that will be described later.

Returning to FIG. 1, an image pick-up means 9 for detecting the area to be processed by the laser beam application means 52 is mounted on the end portion of the casing 521 constituting the above laser beam application means 52. This image pick-up means 9 is constituted by an infrared illuminating means for applying infrared radiation to the workpiece, an optical system for capturing infrared radiation applied by the infrared illuminating means, and an image pick-up device (infrared CCD) for outputting an electric signal corresponding to infrared radiation captured by the optical system, in addition to an ordinary image pick-up device (CCD) for picking up an image with visible radiation. An image signal is supplied to the control means that will be described later.

Figure 5:
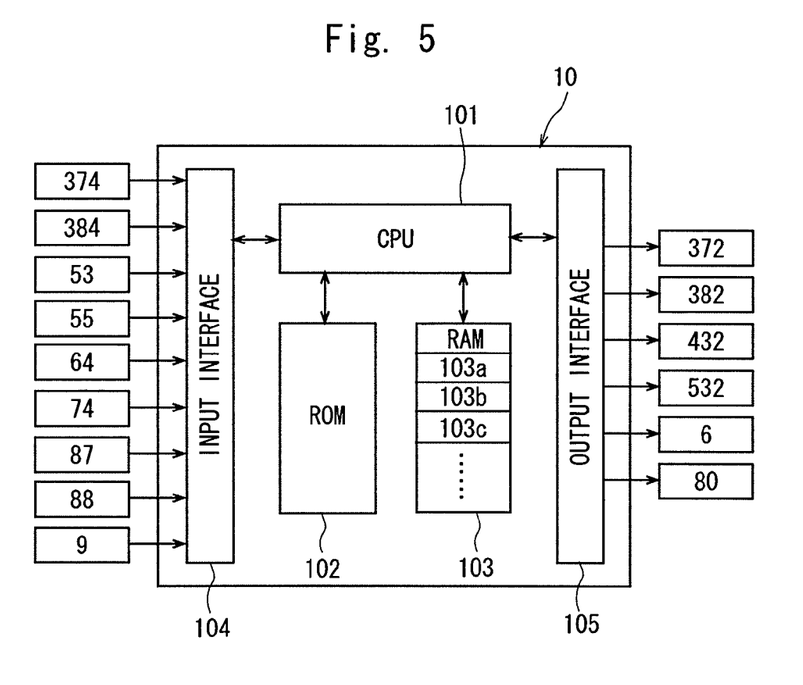
FIG. 5 is a block diagram of a control means provided in the laser beam processing apparatus shown in FIG. 1.

The laser beam processing apparatus in the illustrated embodiment comprises the control means 10 shown in FIG. 5. The control means 10 is composed of a computer comprising a central processing unit (CPU) 101 for carrying out arithmetic processing based on a control program, a read-only memory (ROM) 102 for storing the control program, etc., a read/write random access memory (RAM) 103 for storing the results of operations, an input interface 104 and an output interface 105. Detection signals from the read head 374b of the X-direction position detection means 374, the read head 384b of the Y-direction position detection means 384, the read head 552 of the Z-direction position detection means 55, the first light-receiving device 853, the second light-receiving device 854 and the image pick-up means 9 are applied to the input interface 104 of the control means 10. Control signals are applied to the above pulse motor 372, the pulse motor 382, the pulse motor 432, the pulse motor 532, the processing pulse laser beam oscillation means 6, the detection laser beam oscillation means 81 and the deflection angle adjustment means 64 of the optical axis changing means 60 from the output interface 105 of the control means 10. The above random access memory (RAM) 103 as a memory means has a first storage area 103a for storing the control map shown in FIG. 4, a second storage area 103b for storing the design value data of the workpiece which will be described later, a third storage area 103c for storing the height position of the wafer 10 which will be described later and other storage areas.

The laser beam processing apparatus in the illustrated embodiment is constituted as described above, and its function will be described hereinbelow.

Figure 6:
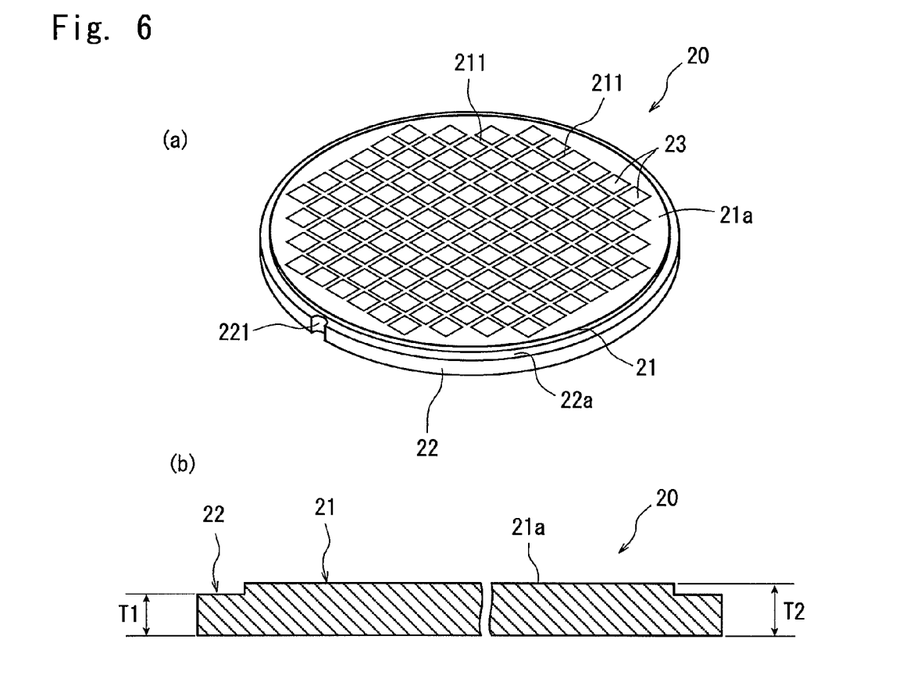
FIGS. 6(a) and 6(b) are a perspective view and an enlarged sectional view of a wafer to be processed by the wafer laser processing method according to the present invention.

FIG. 6(a) is a perspective view of a wafer 20 as the workpiece to be processed by a laser beam and FIG. 6(b) is a sectional view of the wafer 20. The wafer 20 shown in FIGS. 6(a) and 6(b) is a silicon wafer having a diameter of, for example, 200 mm and has a device area 21 where devices are formed and a peripheral excess area 22 surrounding the device area 21 on the front surface. The thickness of the device area 21 constituting the wafer 20 is made larger than the thickness of the peripheral excess area 22. In the illustrated embodiment, the thickness (T1) of the peripheral excess area 22 is set to 500 μm and the thickness (T2) of the device area 21 is set to 600 μm. Therefore, there is a level difference of 100 μm between the surface of the peripheral excess area 22 and the surface of the device area 21. A plurality of areas are sectioned by a plurality of streets 211 formed in a lattice pattern on the front surface 21a of the device area 21 constituting the wafer 20, and micro electric mechanical systems (MEMS) as devices 23 are formed in the sectioned areas. A notch 221 indicative of the crystal orientation of a silicon wafer is formed at the periphery of the peripheral excess area 22 constituting the wafer 20.

Laser processing for forming a deteriorated layer along the streets 211 in the inside of the wafer 20 by applying a laser beam along the streets 211 of the wafer 20 with the above-described laser beam processing apparatus will be described hereinbelow.

Figure 7:
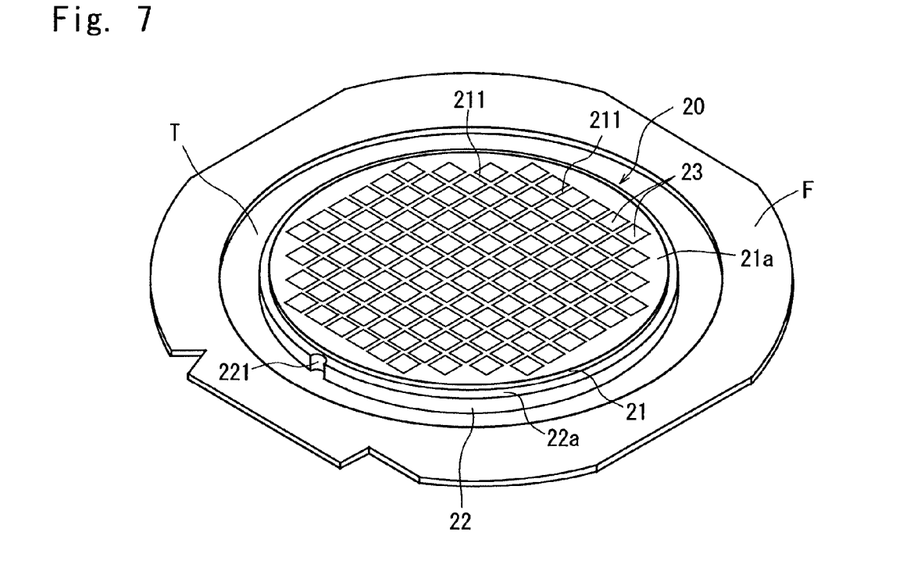
FIG. 7 is a perspective view of the wafer shown in FIGS. 6(a) and 6(b) which is affixed to the front surface of an adhesive tape mounted on an annular frame.

In order to carry out laser processing for forming a deteriorated layer along the streets 211 in the inside of the above-described wafer 20, the wafer 20 is affixed to an adhesive tape T mounted on an annular frame F as shown in FIG. 7. At this point, the rear side of the wafer 20 is affixed to the adhesive tape T so that the front surface (surface side on which the device 23 is formed) faces up.

Since there is a level difference of 100 μm between the thickness (T1) of the peripheral excess area 22 and the thickness (T2) of the device area 21 constituting the wafer 20, the focal point of the laser beam may be, in some cases, positioned near the front surface in the peripheral excess area 22 even though it is positioned in the inside in the device area 21 when the deteriorated layer is to be formed in the inside of the wafer 20 by applying a laser beam from the front surface of the wafer 20. When the laser beam is applied with its focal point positioned near the front surface of the wafer 20, ablation may occur to produce debris thereby though the wavelength of the laser beam has permeability for the wafer. In this case, debris result in adhering to a device 22 to reduce its quality. To cope with this, in the present invention, the application of the laser beam in the peripheral excess area 22 is stopped when the focal point of the laser beam is positioned near the front surface in the peripheral excess area 22. Therefore, before laser processing, the height position of the wafer 20 held on the chuck table 36 is measured by the above-described height position detection means 8, and a boundary position detection step for obtaining the boundary position between the peripheral excess area 22 and the device area 21 is carried out.

To carry out the boundary position detection step, the wafer 20 is first placed on the chuck table 36 of the laser beam processing apparatus shown in FIG. 1 and suction-held on the chuck table 36. At this point, the adhesive tape T side of the wafer 20 is placed on the chuck table 36. Therefore, the front surface of the wafer 20 faces up. The annular frame F is then fixed by the clamps 362 provided on the chuck table 36. The chuck table 36 suction-holding the wafer 20 as described above is brought to a position right below the image pick-up means 9 by the processing-feed means 37.

After the chuck table 36 suction-holding the wafer 20 is positioned right below the image pick-up means 9, alignment work for detecting the area to be processed of the wafer 20 is carried out by the image pick-up means 9 and the control means 10. That is, the image pick-up means 9 and the control means 10 carry out image processing such as pattern matching, etc. to align a plurality of streets 211 formed on the front surface 21a of the device area 21 of the wafer 20 in a predetermined direction with the condenser 7, thereby performing alignment. The alignment is also carried out on streets 211 formed on the front surface 21a of the device area 21 of the wafer 20 in a direction perpendicular to the above-predetermined direction.

As described above, after the above alignment, the wafer 20 on the chuck table 36 becomes a state where the wafer 20 has been situated at the coordinate position shown in FIG. 8(a). FIG. 8(b) shows a state where the chuck table 36, that is, the wafer 20 has been turned 90 degrees from the state shown in FIG. 8(a).

Designed values of feed start position coordinates (A1, A2, A3 . . . An), feed end position coordinates (B1, B2, B3 . . . Bn), feed start position coordinates (C1, C2, C3 . . . Cn) and feed end position coordinates (D1, D2, D3 . . . Dn) of the streets 211 formed on the wafer 20 in the states where it has been situated at the coordinate positions shown in FIGS. 8(a) and 8(b) are stored in the second storage area 103b of the above random access memory (RAM) 103.

After the alignment work is carried out by detecting the streets 211 formed on the wafer 20 held on the chuck table 36 as described above, the chuck table 36 is moved to bring the uppermost street 211 in FIG. 8(a) to a position right below the condenser 7. Then, as shown in FIG. 9(a), the point of the feed start position coordinates (A1) (see FIG. 8(a)) which is one end (left end in FIG. 9(a)) of the street 211 is brought to a positioned right below the condenser 7. And then, the height position detection means 8 is activated and the chuck table 36 is moved in the direction indicated by an arrow X1 in FIG. 9(a) until the point of the feed end position coordinates (B1), that is, the other end (right end in FIG. 9(a)) of the street 211 is reached. Thereby, the height positions of the peripheral excess area 22 and the device area 21 of the wafer 20 and the boundary position 200 between the peripheral excess area 22 and the device area 21 are detected (boundary position detection step). That is, the control means 10 obtains the height positions along the street 211 from the control map shown in FIG. 4 based on detection signals from the above X-direction position detection means 374 and the Y-direction position detection means 384 and the (V1/V2) ratio of the voltage value (V1) output from the first light-receiving device 853 to the voltage value (V2) output from the second light-receiving device 854 and stores them in the third storage area 103c of the above random access memory (RAM) 103.

The detection of the boundary position 200 between the peripheral excess area 22 and the device area 21 of the above wafer 20 will be described in more detail.

Figure 9:
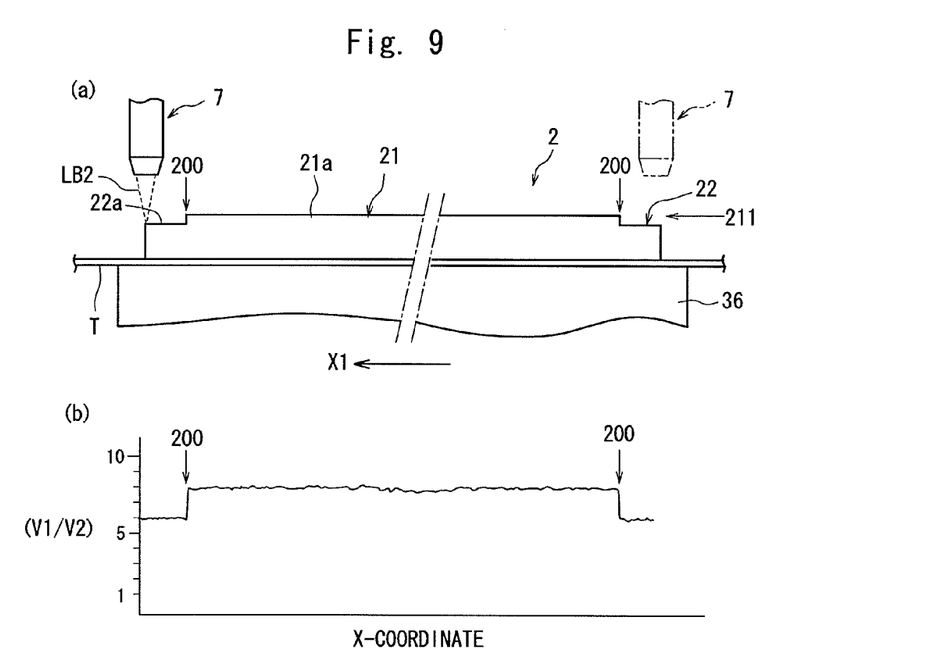
FIGS. 9(a) and 9(b) are explanatory diagrams showing a boundary position detection step in the wafer laser processing method according to the present invention.
Figure 10:
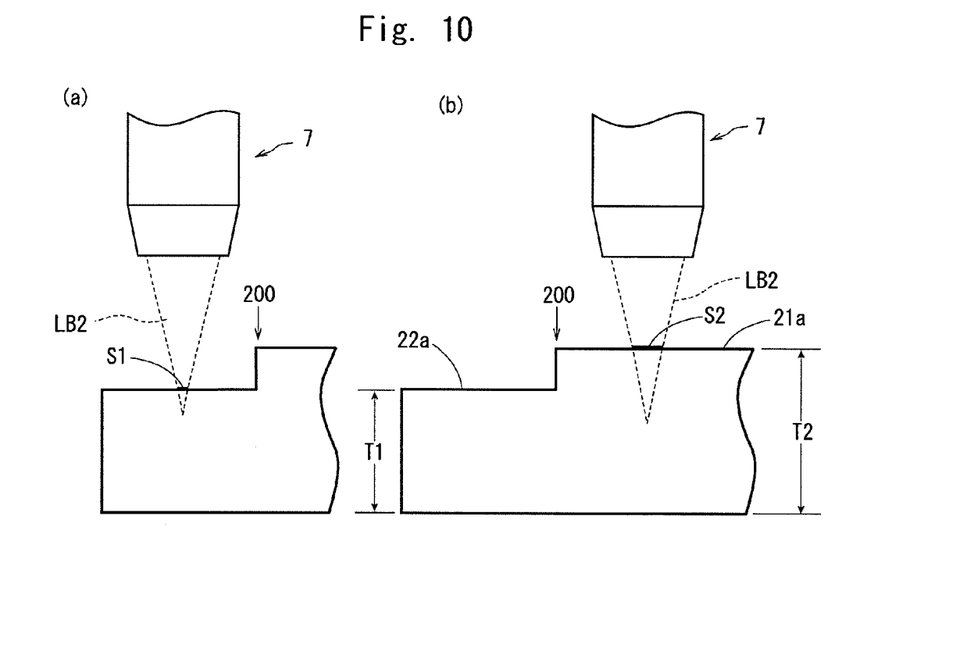
FIGS. 10(a) and 10(b) are explanatory diagrams showing the spot of a detection laser beam applied to the peripheral excess area and the device area of the wafer in the boundary position detection step shown in FIGS. 9(a) and 9(b)

In the state where the peripheral excess area 22 of the wafer 20 is positioned right below the condenser 7, the detection laser beam LB2 is applied from the condenser 7 to the front surface 22a (top surface) having a spot S1 of the peripheral excess area 22 and reflected at the spot S1 as shown in FIG. 10(a). Meanwhile, in the state where the device area 21 of the wafer 20 is positioned right below the condenser 7, the detection laser beam LB2 is applied from the condenser 7 to the front surface 21a (top surface) having a spot S2 of the device area 21 and reflected at the spot S2 as shown in FIG. 10(b). Since the thickness (T2) of the device area 21 is larger than the thickness (T1) of the peripheral excess area 22 as shown in FIG. 10(b), the front surface 21a (top surface) of the device area 21 is higher than the front surface 22a (top surface) of the peripheral excess area 22. Therefore, the spot S2 applied to the front surface 21a (top surface) of the device area 21 has a larger area than that of the spot S1 applied to the front surface 22a (top surface) of the peripheral excess area 22. The height position detection means 8 for detecting the height position of the workpiece held on the chuck table 36 based on the reflected light of the spot S1 and the reflected light of the spot S2 obtains the (V1/V2) ratio of the voltage value (V1) output from the first light-receiving device 853 to the voltage value (V2) output from the second light-receiving device 854 of the reflected light analyzing means 85 as described above. And, the voltage value (V2) output from the second light-receiving device 854 drastically decreases as soon as the boundary position 200 between the peripheral excess area 22 and the device area 21 is reached as shown in FIG. 9(b) though the voltage value (V1) output from the first light-receiving device 853 does not change, and the (V1/V2) ratio of the voltage value (V1) output from the first light-receiving device 853 to the voltage value (V2) output from the second light-receiving device 854 drastically increases as soon as the boundary position 200 between the device area 21 and the peripheral excess area 22 is reached. Therefore, the control means 10 stores the coordinate values of the boundary position 200 between the peripheral excess area 22 and the device area 21 in the third storage area 103c of the random access memory (RAM) 103 together with the above height position based on detection signals from the X-direction position detection means 374 and the Y-direction position detection means 384 at the time when the (V1/V2) ratio of the voltage value (V1) output from the first light-receiving device 853 to the voltage value (V2) output from the second light-receiving device 854 drastically changes. The boundary position detection step is thus carried out along all the streets 211 formed on the wafer 20, and the height positions and the boundary positions along all the streets 211 are stored in the third storage area 103c of the random access memory (RAM) 103.

After the boundary position detection step is carried out along all the streets 211 formed on the wafer 20 as described above, laser processing for forming a deteriorated layer along the streets 211 in the inside of the wafer 20 is carried out.

Figure 11:
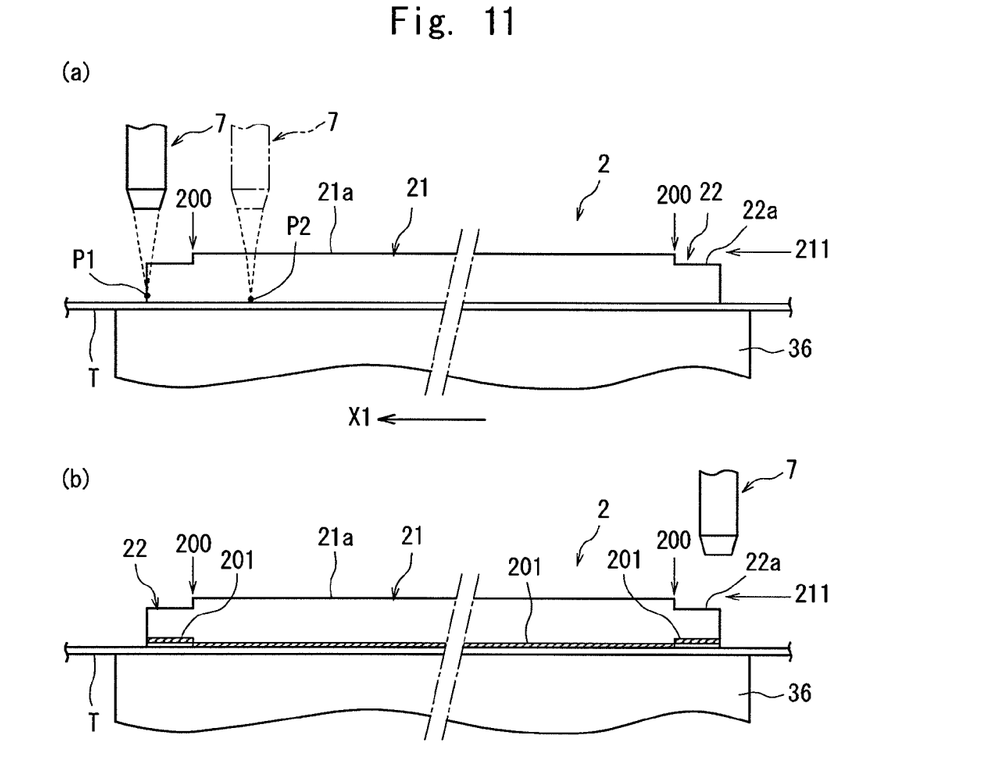
FIGS. 11(a) and 11(b) are explanatory diagrams showing a first deteriorated layer forming step in the wafer laser processing method according to the present invention.

To carry out laser processing, the chuck table 36 is first moved to bring the uppermost street 211 in FIG. 8(a) to a position right below the condenser 7. Then, further, as shown in FIG. 11(a), the point of the feed start position coordinates (A1) (see FIG. 8(a)) which is one end (left end in FIG. 11(a)) of the street 211 is brought to a position right below the condenser 7. The control means 10 activates the focal point position adjustment means 53 to set the focal point P1 of the processing pulse laser beam LB1 applied from the condenser 7 to a predetermined depth position from the front surface 22a (top surface) of the peripheral excess area 22 of the wafer 20. When the focal point of the processing pulse laser beam LB1 applied from the condenser 7 is thus positioned at P1 in the peripheral excess area 22, the focal point of the processing pulse laser beam LB1 applied from the condenser 7 is positioned at P2 below P1 in FIG. 11(*a*) in the device area 21 as shown by the two-dot chain line in FIG. 11(*a*) due to the refractive index of silicon constituting the wafer 20.

Figure 8:
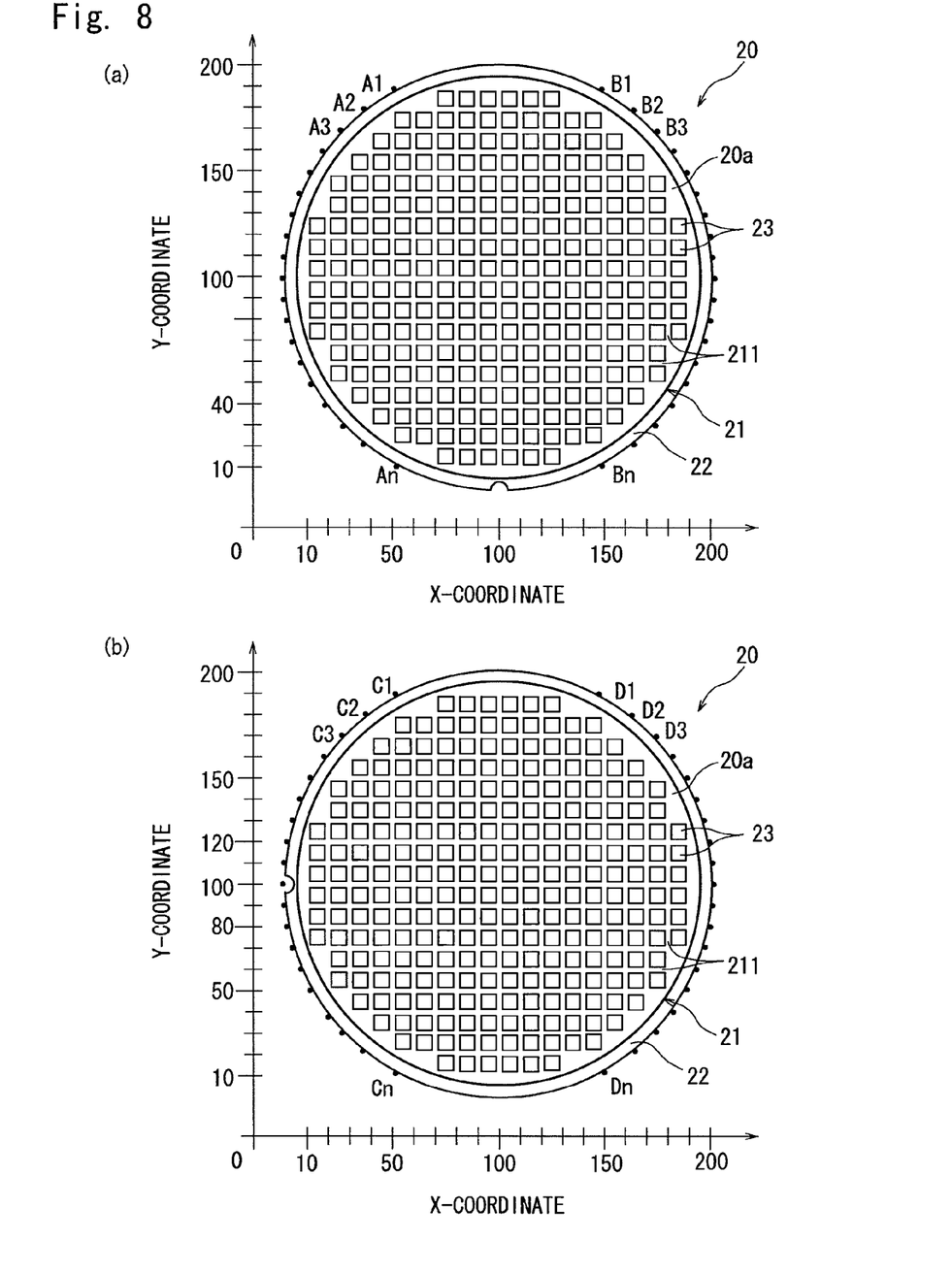
FIGS. 8(a) and 8(b) are explanatory diagrams showing the relationship between the wafer shown in FIG. 6 and coordinate positions when the wafer is held at predetermined positions of the chuck table of the laser beam processing apparatus shown in FIG. 1.

After the uppermost street 211 formed on the wafer 20 as shown in FIG. 8(*a*) is positioned right below the condenser 7 and the focal point P1 of the processing pulse laser beam LB1 is positioned at the predetermined depth position from the front surface 22*a* (top surface) of the peripheral excess area 22 of the wafer 20, the control means 10 activates the processing pulse laser beam oscillation means 6 and applies a voltage of, for example, 0 V to the deflection angle adjustment means 64 constituting the optical axis changing means 60. As a result, the optical axis of the processing pulse laser beam LB1 oscillated from the processing pulse laser beam oscillation means 6 is directed to the condenser 7 and the processing pulse laser beam LB1 is applied from the condenser 7 as described above. Then, the control means 10 moves the chuck table 36 in the direction indicated by the arrow X1 at a predetermined processing-feed rate (first deteriorated layer forming step). And, when the application position of the condenser 7 reaches the point of the feed end position coordinates (B1) (see FIG. 8(*a*)) which is the other end (right end in FIG. 11(*b*)) of the street 211 as shown in FIG. 11(*b*), the control means 10 applies a voltage of, for example, 10 V to the deflection angle adjustment means 64 constituting the optical axis changing means 60 and stops the movement of the chuck table 36. As a result, the processing pulse laser beam LB1 oscillated from the processing pulse laser beam oscillation means 6 is guided to the laser beam absorbing means 65 as shown by the broken line in FIG. 2 as described above. Thus, a deteriorated layer 201 is formed in the inside of the wafer 20 as shown in FIG. 11(*b*) by carrying out the first deteriorated layer forming step.

The processing conditions in the above first deteriorated layer forming step are set as follows, for example.

Laser: YVO4 pulse laser
Wavelength: 1,064 nm
Cyclic frequency: 100 kHz
Pulse output: 2.5 µJ
Focal spot diameter: 1 µm
Processing-feed rate: 100 mm/sec The thickness of the deteriorated layer formed under the above processing conditions is about 50 µm. Therefore, to divide the wafer 20 along the streets 211 easily, the deteriorated layers must be laminated in the thickness direction of the wafer 20 to form them. To form the deteriorated layers in the thickness direction of the wafer 20, the above first deteriorated layer forming step is carried out repeatedly by activating the above focal point position adjustment means 53 to raise the laser beam application means 52 stepwise so that the focal point of the processing pulse laser beam LB1 applied from the condenser 7 is moved up stepwise.

Figure 12:
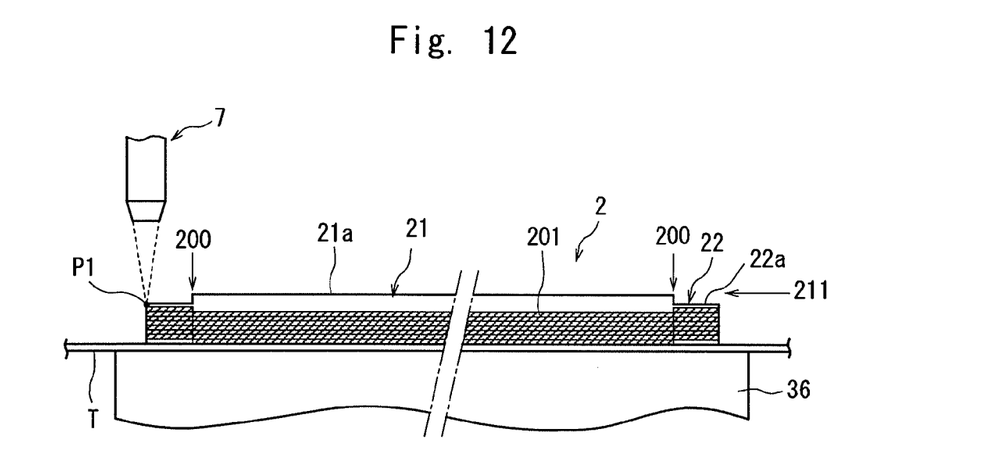
FIG. 12 is an explanatory diagram showing a second deteriorated layer forming step in the wafer laser processing method according to the present invention.

However, when the focal point P1 of the processing pulse laser beam LB1 applied from the condenser 7 is positioned near the front surface 22*a* (top surface) of the peripheral excess area 22 of the wafer 20 as shown in FIG. 12 at the time of forming the deteriorated layers 201 in the thickness direction of the wafer 20, though the wavelength of the processing pulse laser beam LB1 has permeability for the silicon wafer, ablation occurs, thereby producing debris which adhere to a device 23 to reduce its quality. Therefore, the control means 10 so controls as to stop the application of the laser beam to the peripheral excess area 22 in the case where the focal point P1 of the processing pulse laser beam LB1 applied from the condenser 7 is positioned near the front surface 22*a* (top surface) of the peripheral excess area 22 of the wafer 20. The control means 10 judges whether the focal point P1 of the processing pulse laser beam LB1 is positioned near the front surface 22*a* (top surface) of the peripheral excess area 22 of the wafer 20 by obtaining the position of the focal point P1 of the processing pulse laser beam LB1 based on the height position of the peripheral excess area 22 stored in the third storage area 103*c* of the random access memory (RAM) 103 and on a detection signal from the Z-direction position detection means 55. Although the area where ablation occurs at the time when the focal point P1 of the processing pulse laser beam LB1 is positioned near the front surface 22*a* (top surface) of the peripheral excess area 22 of the wafer 20 differs according to processing conditions such as the output, etc. of the processing pulse laser beam LB1, an area ±10 µm from the front surface 22*a* (top surface) of the peripheral excess area 22 of the wafer 20 may be set under the above processing conditions.

Figure 13:
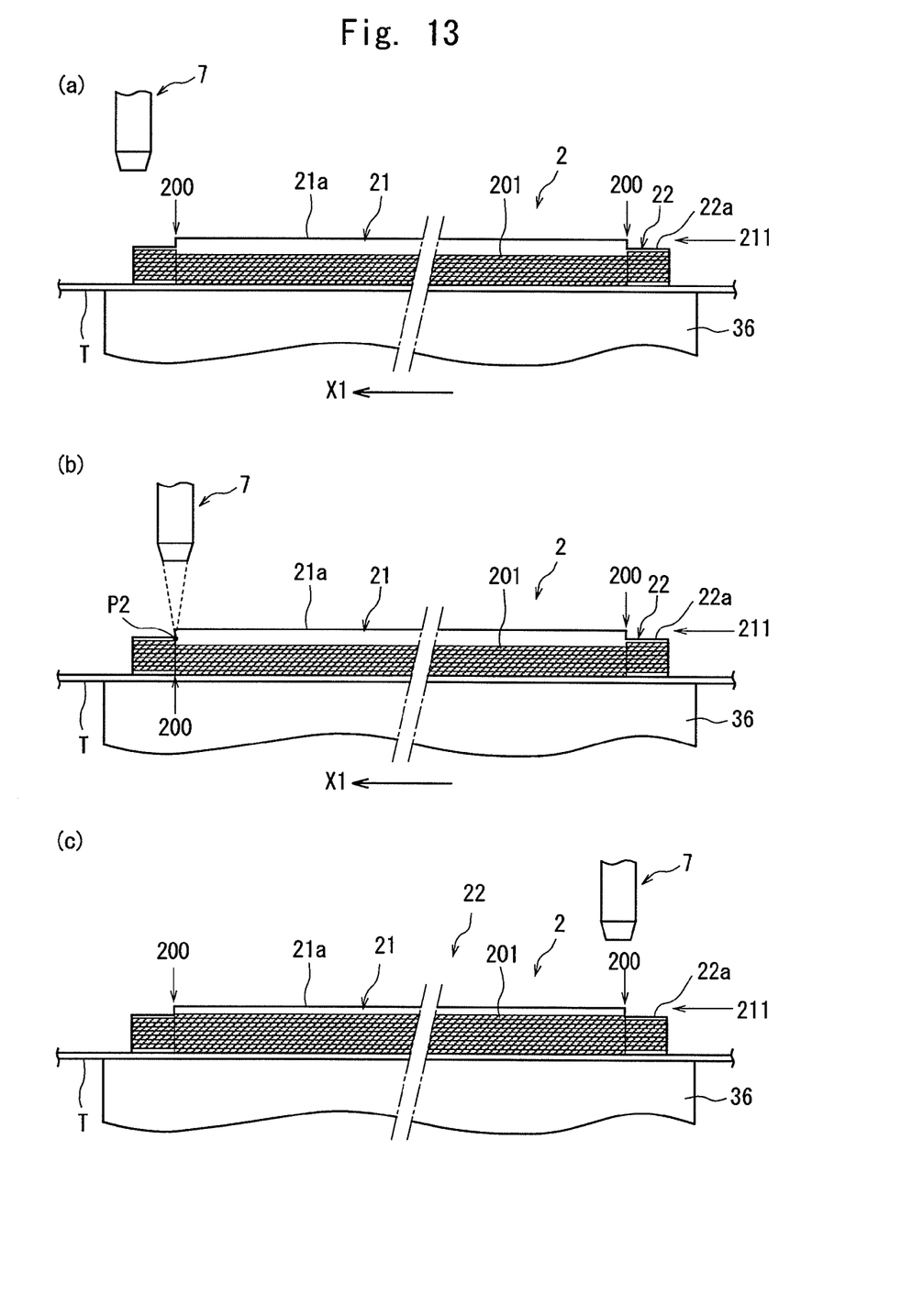
FIGS. 13(a), 13(b) and 13(c) are explanatory diagrams showing the second deteriorated layer forming step in the wafer laser beam processing method according to the present invention.

When the control means 10 judges that the focal point P1 of the processing pulse laser beam LB1 applied from the condenser 7 is positioned near the front surface 22*a* (top surface) of the peripheral excess area 22 of the wafer 20 as described above, a second deteriorated layer forming step is carried out to form a deteriorated layer along the streets 211 in the inside of the device area 21 by applying a laser beam to the device area 21 along the streets 211 with its focal point positioned in the inside of the device area 21 without applying the laser beam to the peripheral excess area 22. That is, the control means 10 applies a voltage of, for example, 10 V to the deflection angle adjustment means 64 constituting the optical axis changing means 60 and activates the processing pulse laser beam oscillation means 6 so that the processing pulse laser beam LB1 oscillated from the processing pulse laser beam oscillation means 6 is guided to the laser beam absorbing means 65 as shown by the broken line in FIG. 2, and moves the chuck table 36 in the direction indicated by the arrow X1 at a predetermined processing-feed rate in FIG. 13(*a*). Then, when the point of the coordinates of the boundary position 200 between the peripheral excess area 22 and the device area 21 of the wafer 20 held on the chuck table 36 is reached as shown in FIG. 13(*b*), the control means 10 applies a voltage of, for example, 0 V to the deflection angle adjustment means 64 constituting the optical axis changing means 60. As a result, the optical axis of the processing pulse laser beam LB1 oscillated from the processing pulse laser beam oscillation means 6 is directed to the condenser 7 and the processing pulse laser beam LB1 is applied to the focal point P2 from the condenser 7, as described above. Then, when the point of the coordinates of the boundary position 200 between the device area 21 and the peripheral excess area 22 of the wafer 20 held on the chuck table 36 is reached as shown in FIG. 13(*c*), the control means 10 applies a voltage of, for example, 10 V to the deflection angle adjustment means 64 constituting the optical axis changing means 60 so that the processing pulse laser beam LB1 oscillated from the processing pulse laser beam oscillation means 6 is guided to the laser beam absorbing means 65 as shown by the broken line in FIG. 2. As a result, the deteriorated layer 201 is formed only in the device area 21 in the inside of the wafer 20 as shown in FIG. 13(*c*). The processing conditions in the second deteriorated layer forming step may be the same as the processing conditions in the above first deteriorated layer forming step.

As described above, in the present invention, when the focal point P1 of the processing pulse laser beam LB1 applied from the condenser 7 is positioned near the front surface 22*a* (top surface) of the peripheral excess area 22 of the wafer 20, the above second deteriorated layer forming step is carried out to stop the application of the processing pulse laser beam LB1 to the peripheral excess area 22 and apply the processing pulse laser beam LB1 only to the device area 21. Therefore, the deteriorated layer 201 can be formed only in the device area 21 without causing ablation to produce debris.

After the first deteriorated layer forming step and the second deteriorated layer forming step are carried out along all the streets 211 formed in the predetermined direction of the wafer 20 as described above, the chuck table 36 is turned at 900 to carry out the above deteriorated layer forming steps along the streets 211 formed in a direction perpendicular to the above predetermined direction. After the above processing steps are thus carried out along all the streets 211 formed on the wafer 20, the chucktable 36 holding the wafer 20 is returned to the position where it first suction-held the wafer 20 and its suction-holding of the wafer 20 is canceled. The wafer 20 is then carried to the dividing step by a conveying means that is not shown.

What is claimed is:

1. A wafer laser processing method for forming deteriorated layers along a plurality of streets in the inside of a wafer having a device area where a plurality of areas are sectioned by the plurality of streets arranged in a lattice pattern on the front surface and devices are formed in the sectioned areas and having a peripheral excess area surrounding the device area, the surface of the device area being formed to be higher than the surface of the peripheral excess area, by applying a laser beam to the front surface of the wafer along the streets with its focal point set to the inside of the wafer, comprising:

a first deteriorated layer forming step for forming a deteriorated layer along the streets in the insides of the peripheral excess area and the device area by applying a laser beam to the peripheral excess area and the device area along the streets with its focal point set in the material of the peripheral excess area and the device area from the front surface side of the wafer; and a second deteriorated layer forming step for forming a deteriorated layer along the streets in the inside of the device area by applying a laser beam to the device area along the streets with its focal point set in the material of the device area without applying the laser beam to the peripheral excess area when the focal point of the laser beam is positioned near the front surface of the peripheral excess area.

2. The wafer laser processing method according to claim 1, further comprising a height detection step for detecting a boundary position between the peripheral excess area and the device area, and the height position of the surface of the peripheral excess area and the device area by applying a detection laser beam along the streets of the wafer.

3. The wafer laser processing method according to claim 1, wherein the first deteriorated layer forming step is repeated to form multiple deteriorated layers in the insides of the peripheral excess area and the device area.

4. The wafer laser processing method according to claim 3, wherein the multiple deteriorated layers formed by repeating the first deteriorated layer forming step are formed from a lower level to a higher level.

5. The wafer laser processing method according to claim 3, wherein the second deteriorated layer forming step is repeated to form multiple deteriorated layers in the inside of the device area.

6. The wafer laser processing method according to claim 5, wherein the multiple deteriorated layers formed in the peripheral excess area and the device area by repeating the first deteriorated layer forming step, and the multiple deteriorated layers formed in the device area by repeating the second deteriorated layer forming step, are each formed from a lower level to a higher level.

7. The wafer laser processing method according to claim 1, wherein the second deteriorated layer forming step is repeated to form multiple deteriorated layers in the inside of the device area.

8. The wafer laser processing method according to claim 7, wherein the multiple deteriorated layers formed by repeating the second deteriorated layer forming step are formed from a lower level to a higher level.

* * * * *